United States Patent [19]

Schröder et al.

[11] Patent Number: 5,197,052
[45] Date of Patent: Mar. 23, 1993

[54] PERSONAL COMPUTER DICTATION SYSTEM WITH VOICE ANAD TEXT STORED ON THE SAME STORAGE MEDIUM

[75] Inventors: Günter Schröder, Oberasbach; Helmut Abraham, Pyrbaum; Kasimir Arciszewski, Munich, all of Fed. Rep. of Germany

[73] Assignee: Grundig E.M.V., Fuerth/Bay, Fed. Rep. of Germany

[21] Appl. No.: 707,203

[22] Filed: May 23, 1991

Related U.S. Application Data

[63] Continuation of Ser. No. 319,635, Mar. 6, 1989, abandoned.

[30] Foreign Application Priority Data

Mar. 10, 1988 [DE] Fed. Rep. of Germany ....... 3807851

[51] Int. Cl.$^5$ .............................................. G11B 19/02
[52] U.S. Cl. ..................................................... 369/25
[58] Field of Search ..................................... 369/25-29, 369/50; 379/67, 73, 75-77, 88, 89; 395/2

[56] References Cited

U.S. PATENT DOCUMENTS

| | | | |
|---|---|---|---|
| 3,158,685 | 11/1964 | Gerstman et al. | 381/52 |
| 3,632,887 | 1/1972 | Leipp et al. | 381/52 |
| 4,221,933 | 9/1980 | Cornell et al. | 379/84 |
| 4,539,435 | 9/1985 | Eckmann | 379/77 X |
| 4,621,350 | 11/1986 | Sevitsky et al. | 369/25 X |
| 4,747,126 | 5/1988 | Hood et al. | 379/73 X |
| 4,837,798 | 6/1989 | Cohen et al. | 379/88 |
| 4,837,807 | 6/1989 | Szeto et al. | 379/67 X |
| 4,853,952 | 8/1989 | Jachmann et al. | 379/88 |
| 4,856,069 | 8/1989 | Kolodny et al. | 381/52 |
| 4,908,866 | 3/1990 | Goldwasser et al. | 369/50 X |
| 5,146,439 | 9/1992 | Jachmann et al. | 369/25 |

*Primary Examiner*—John Sheppered
*Assistant Examiner*—Edward H. Sikorski
*Attorney, Agent, or Firm*—Kane, Dalsimer, Sulllivan, Kurucz, Levy, Eisele and Richard

[57] ABSTRACT

A computer, in particular a personal computer with the voice input and a voice output system thereby allowing the computer to be used as an integrated dictation system.

The computer includes analog-to-digital conversion means for converting analog signals corresponding to the spoken word into digital signals. These digital signals are stored in the storage device of the computer. The digital representations are recalled from the storage and converted to sounds by a digital-to-analog conversion means and a headset for the user to listen to while transcribing the words via the keyboard of the computer.

7 Claims, 1 Drawing Sheet

PERSONAL COMPUTER DICTATION SYSTEM WITH VOICE ANAD TEXT STORED ON THE SAME STORAGE MEDIUM

BACKGROUND OF THE INVENTION

1. Field of the Invention

The invention relates to a computer, in particular a personal computer, with a voice input/output system, for use as an integrated dictation system.

2. Description of the Prior Art

In order to take dictation, normally two devices are required—a dictation recorder and a computer, particularly a personal computer, configured as a word-processor. A first person speaks into the dictation recorder, then a second person plays the recording back, typically through headphones, while transcribing the spoken words through a keyboard of a word-processor.

This process is disadvantageous in that a typical transcription recorder uses recording tape or other media which is not well-adapted to long-term storage or abuse. Indeed, the use of magnetic tape for acoustic recording is becoming an outdated technology in view of modern digital audio recording techniques.

However, the use of many modern computers, especially those equipped with digital audio equipment, may be too complex and intimidating for many office workers.

Furthermore, the use of two different pieces of electronic equipment is awkward in the dictation process.

OBJECTS AND SUMMARY OF THE INVENTION

It is therefore an object of this invention to provide an integrated dictation and word-processing device, which uses digital audio technology to record the spoken word onto common portable means such as a floppy disk.

It is therefore a further object of this invention to provide an integrated dictation and word-processing device which is simple for office personnel to use without extensive and time-consuming training.

These and other objects of this invention are achieved by providing a personal computer with a digital audio input port which is responsive to a coding circuit which includes analog-to-digital conversion means, which is, in turn, responsive to a dictation microphone (i.e., acoustic to analog electric signal conversion means). The personal computer also includes an output port leading to a voice output system, including digital-to-analog conversion means and a listening means, such as a headphone.

The input and the output port both communicate with the computer via an interlocking circuit, which is, in turn, responsive to a multi-position foot switch as is common with conventional dictation machines.

The personal computer includes a conventional keyboard which allows the user to input typed words as they listen to the dictation through the headphone.

DETAILED DESCRIPTION OF THE PREFERRED EMBODIMENT

Figure 1:
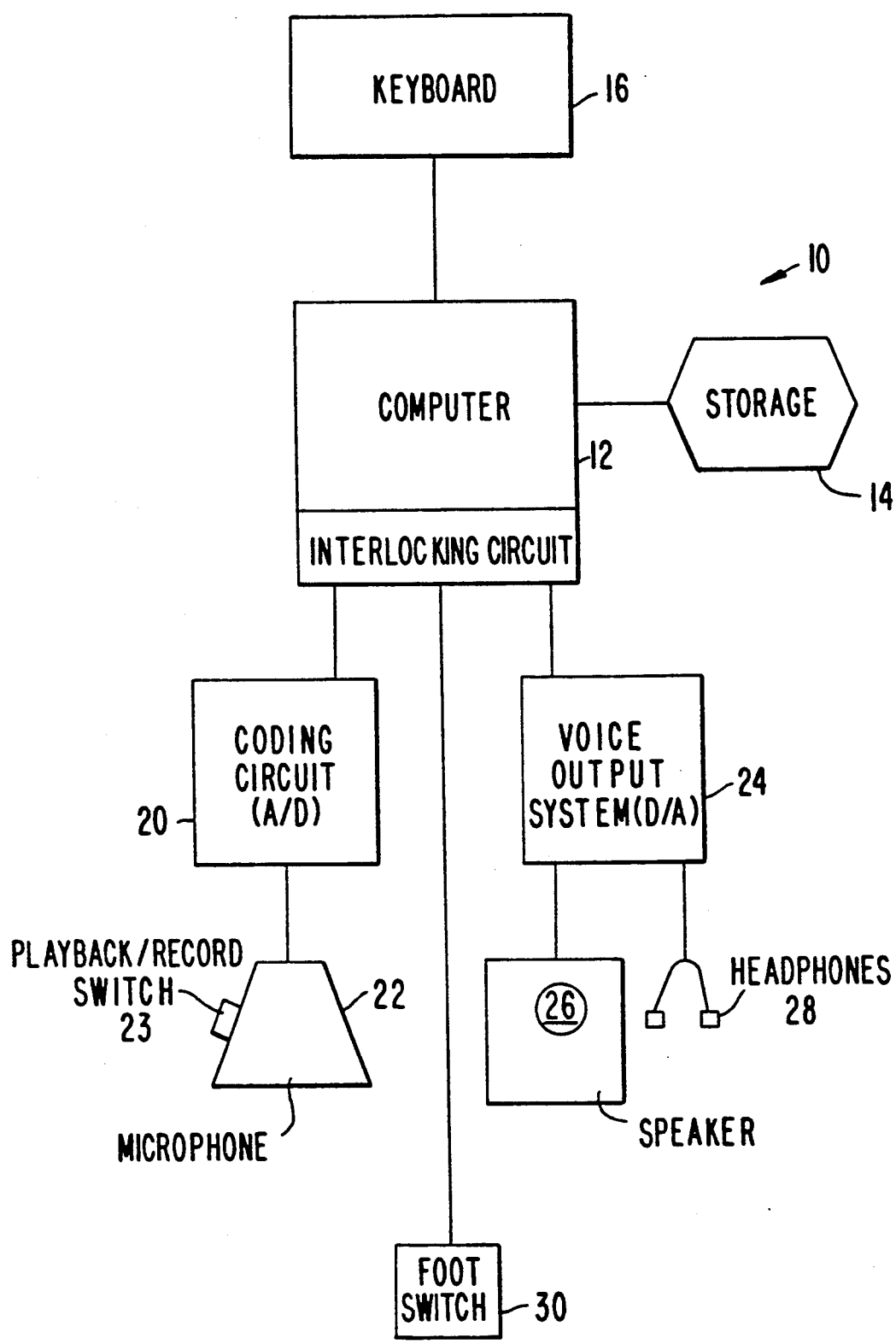
FIG. 1 discloses a block diagram of the present invention.

FIG. 1 discloses apparatus 10 including a computer 12, preferably a personal computer with storage 14, such as a floppy or hard disk. Computer 12 includes a keyboard 16 and interlocking circuit 18. Interlocking circuit 18 includes a first interface to a coding circuit 20 which includes an analog-to-digital conversion means. Coding circuit 20, in turn, is responsive to microphone 22 (i.e. a transducer for converting acoustic energy 'the spoken word' into analog electrical signals to be converted into digital signals by the coding circuit). Microphone 22 includes playback/record switch 23.

A second interface leads to voice output system 24 which includes digital-to-analog conversion means which receives digitally encoded representations of the spoken words as stored in storage 14. Voice output system 24 converts these digital signals into analog electrical signals corresponding to the spoken word and transmits these analog electrical signals to a speaker 26 or headphone 28 for the user to hear. Interlocking circuit 18 and computer 12 are responsive to a third interface responsive to foot switch 30 which operates in the same function as the foot switch of a regular dictation recorder.

Normally, dictating device microphones are provided with three operating keys or switches through which, by a suitable actuation, the functions "ready to record", "start", (for playback and recording), "stop" (for playback and recording),"short return movement" and "index marking" are controllable. By a combined actuation of keyboard 16 and switch 23, other functions are feasible, for example, "correction limit".

Preferably, the computer is provided with an additional text processing program which is usable simultaneously with the voice input and voice output system. Thus the advantage is provided that a dictation recorded on the floppy disk or the hard disk can be simultaneously listened to and simultaneously written through the keyboard of the computer. The interfaces which are provided for controlling the recording/playback modes are advantageously commonly connected with one another by means of an interlocking circuit 18 with the coding circuit 20 permitting either a control of the dictating or playback mode through the dictating microphone 22 or a control of the playback mode through the foot switch 30.

Depending on the equipment of the computer or personal computer, the number of floppy disks or hard disks, configured as a single or multiposition system, the device may be used as a single or central dictating equipment.

To use apparatus 10, the user properly configures computer 12 and speaks into microphone 22 with playback/record switch 23 and foot switch 30 in appropriate positions. The spoken word is transduced into an analog electrical signal by microphone 22 and into a digital electrical signal by coding circuit 20. The digital signal is stored temporarily in computer 12 and eventually stored in storage 14. Storage 14 may be a hard disk, floppy disk, or any other appropriate device. In the case of floppy disks, the stored digital information may be thereby transferred manually between similar apparatus. The dictationist enters the appropriate commands into keyboard 16 so that the digital information is retrieved from storage 14, converted into electrical analog signals by voice output system 24 and converted to acoustic signals by speaker 26 or headphones 28. The dictationist simultaneously transcribes these words through keyboard 16. The resulting digital image is eventually stored in storage 14 in conventional text format.

Obviously, many modifications and variations of the invention are possible in light of the above description. It is therefore to be understood that within the scope of the appended claims, the invention may be practiced otherwise than as specifically described.

What is claimed is:

1. An integrated dictation device comprising a computer including a keyboard and a non-volatile storage device, said storage device being responsive to said keyboard, said storage device further being responsive to a voice input/output system through which application-specific text can e input via an input port by a microphone including a playback/record switch, and output via an output port by a listening device proximate to said keyboard, wherein a coding circuit converts commands entered through said playback/record switch and said microphone into digital format to which said storage device is responsive, wherein sequencing between said input port and said output port is controlled by said playback/record switch, said voice input/output system further including analog-to-digital and digital-to-analog means, and said coding circuit including means for a user to listen to output from said storage device through said output port substantially simultaneously with entering data into said keyboard eventually bound for said storage device via said input port.

2. The integrated dictation device of claim 1 wherein the computer is a personal computer.

3. The integrated dictation device of claim 2 wherein said listening device is a headset.

4. The integrated dictation device of claim 1 wherein said coding circuit is structurally attached to the computer and a first externally accessible interface is connected with the voice input/output system to which a playback means is connected for playback operation, said playback means generating commands for playback control and to a listening device.

5. The integrated dictation device of claim 1 or 4 wherein a second accessible interface on the computer is connected to the coding circuit and a third externally accessible interface is connected with the voice input/output system to which a playback means is connected for playback operation, said playback means generating commands for playback control and to a listening device.

6. The integrated dictation device of claim 5 wherein coding circuit and said voice output system are connected to an interlocking circuit thereby permitting the choice of control of the dictating/playback operating through the microphone or control of the playback operation through said keyboard.

7. The integrated dictation device of claim 6 including a text processing system which is usable simultaneously with the voice input/output system.

* * * * *